(12) United States Patent
Shimoyasu et al.

(10) Patent No.: US 8,944,700 B2
(45) Date of Patent: Feb. 3, 2015

(54) CONNECTOR

(71) Applicant: Tyco Electronics Japan G.K., Kanagawa-ken (JP)

(72) Inventors: Takashi Shimoyasu, Kanagawa (JP); Shinji Yamada, Kanagawa (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 13/955,557

(22) Filed: Jul. 31, 2013

(65) Prior Publication Data
US 2014/0037248 A1    Feb. 6, 2014

(30) Foreign Application Priority Data

Jul. 31, 2012    (JP) .................................. 2012-169587

(51) Int. Cl.
G02B 6/36    (2006.01)
G02B 6/38    (2006.01)

(52) U.S. Cl.
CPC .............. *G02B 6/3807* (2013.01); *G02B 6/38* (2013.01)
USPC .............................................. 385/76; 385/78

(58) Field of Classification Search
USPC ............................. 385/76, 78, 84, 86, 88, 136
See application file for complete search history.

(56) References Cited

U.S. PATENT DOCUMENTS

| | | | |
|---|---|---|---|
| 6,746,264 B1* | 6/2004 | Branch et al. ................. | 439/352 |
| 8,517,616 B2* | 8/2013 | Yi .................................. | 385/92 |
| 2005/0003696 A1* | 1/2005 | Shirk et al. .................... | 439/352 |
| 2008/0232758 A1* | 9/2008 | Miyoshi et al. ............... | 385/136 |

FOREIGN PATENT DOCUMENTS

| | | |
|---|---|---|
| JP | 2001141958 A | 5/2001 |
| JP | 2005173173 A | 6/2005 |
| JP | 2009258568 A | 5/2009 |
| JP | 2010170749 A | 8/2010 |

* cited by examiner

*Primary Examiner* — Ellen Kim
(74) *Attorney, Agent, or Firm* — Barley Snyder (57) ABSTRACT

A locking connector having a body with a receiving section and a mating section. The locking connector includes a cantilevered lock arm with a pivoting end integrally formed with a midpoint of the receiving section and extending along an axial direction towards a mating end of the mating section. The locking connector also includes a locking projection disposed on an outer surface of a mating end of the cantilevered lock arm. A lock release arm is integrally formed with the mating end of the cantilevered lock arm and separately extends along the axial direction from the mating end of the cantilevered lock arm towards the receiving section. The lock release arm projects from a terminal end of the receiving section.

16 Claims, 9 Drawing Sheets

FIG. 9

CONNECTOR

CROSS-REFERENCE TO RELATED APPLICATIONS

This application claims the benefit of the filing date under 35 U.S.C. §119(a)-(d) of Japanese Patent Application No. 2012-169587, filed Jul. 31, 2012.

FIELD OF THE INVENTION

The invention relates to a fiber optic connector.

BACKGROUND

Conventional electrical connectors include a locking mechanism for locking corresponding electrical connector components together, while simultaneously providing an unlocking mechanism for disengaging the corresponding electrical connector components.

Japanese Patent Application No. 2005-173173A illustrates an optical connector having a conventional unlocking mechanism for disengaging an optical transmit module and a receive module. The optical connector has a housing and a slide cover, whereby the housing includes a lock lever, and the slide cover includes an abutment section and an operation section. When the operation section of the slide cover is pulled by a finger to cause the slide cover to be slid rearward, the abutment section displaces the lock lever to allow the transmit and receive modules to unlock and disengage from each other. This design permits the transmit and receive modules to be unlocked and disengaged in one operation.

Japanese Patent Application No. 2009-258568A also illustrates an optical connector having a conventional unlocking mechanism, which includes a housing and a cover, whereby the housing has a lock lever, and the cover has a pressing plate section and a remote operation lever. When the remote operation lever is operated, the pressing plate section drives a lock base section of the lock lever to release locking.

However, the conventional connectors disclosed in Japanese Patent Application Nos. 2005-173173A and 2009-258568A both utilize an unlocking mechanism that is separate from the housing, which results in a locking and release mechanism having a large number of parts.

SUMMARY

It is therefore an object of the invention, among others, to provide a locking connector having a reduced number of parts that unlocks and detaches in one step.

The locking connector includes a body with a receiving section and a mating section. The locking connector includes a cantilevered lock arm with a pivoting end integrally formed with a midpoint of the receiving section and extending along an axial direction towards a mating end of the mating section. The locking connector also includes a locking projection disposed on an outer surface of a mating end of the cantilevered lock arm. A lock release arm is integrally formed with the mating end of the cantilevered lock arm and separately extends along the axial direction from the mating end of the cantilevered lock arm towards the receiving section. The lock release arm projects from a terminal end of the receiving section.

BRIEF DESCRIPTION OF THE DRAWINGS

The invention will now be describe by way of example with reference to accompanying figures of which.

DETAILED DESCRIPTION OF THE EMBODIMENTS

An embodiment of the connector of the invention will be described with reference to the attached drawings.

Figure 1:
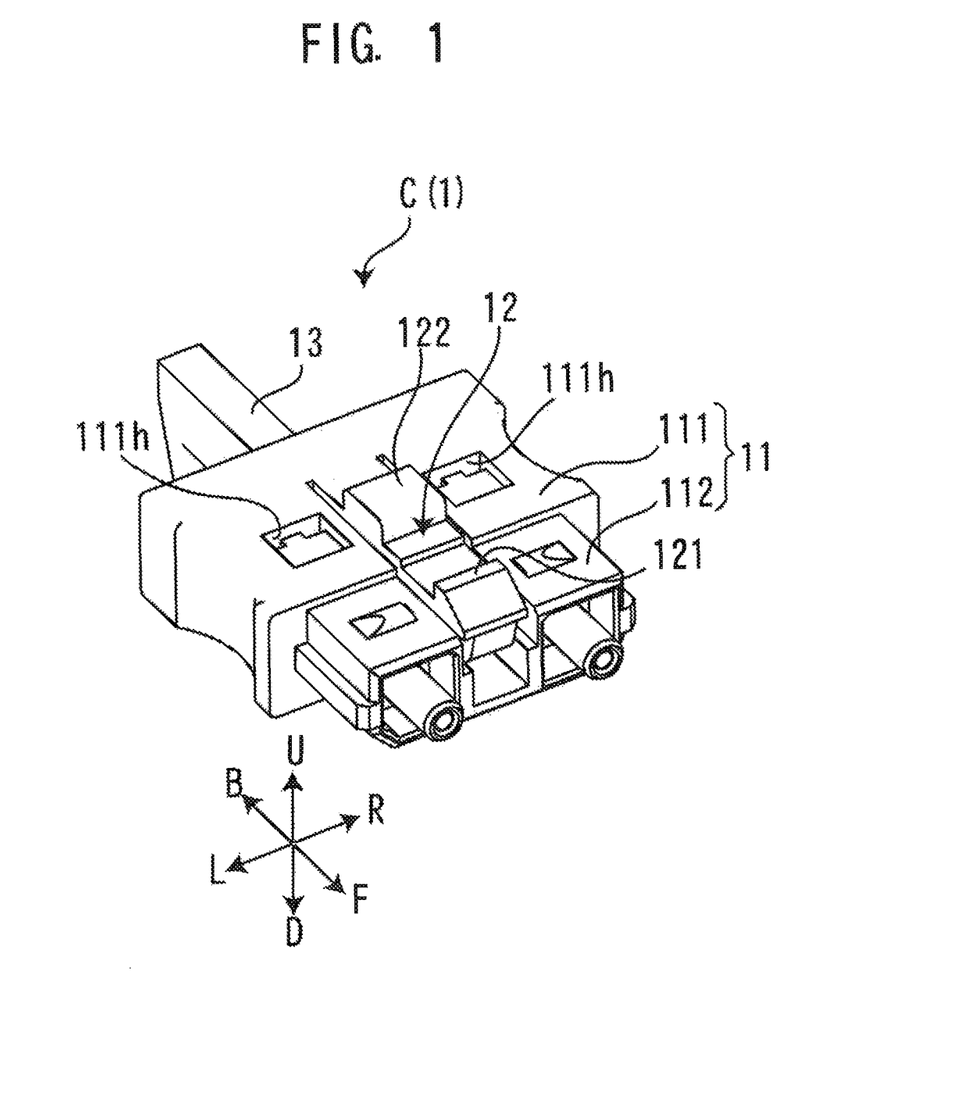
FIG. 1 is a perspective front view illustrating an embodiment of a locking connector.
Figure 2:
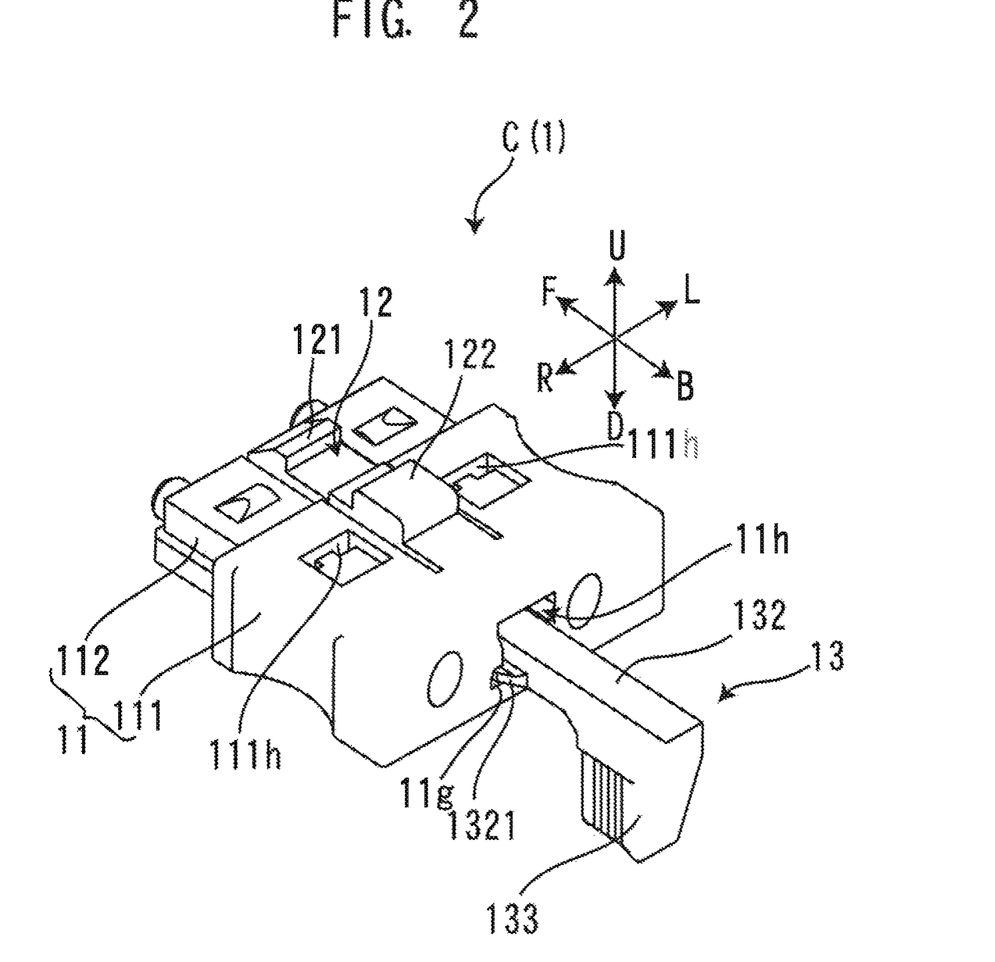
FIG. 2 is a perspective rear view illustrating the embodiment of the locking connector.
Figure 3:
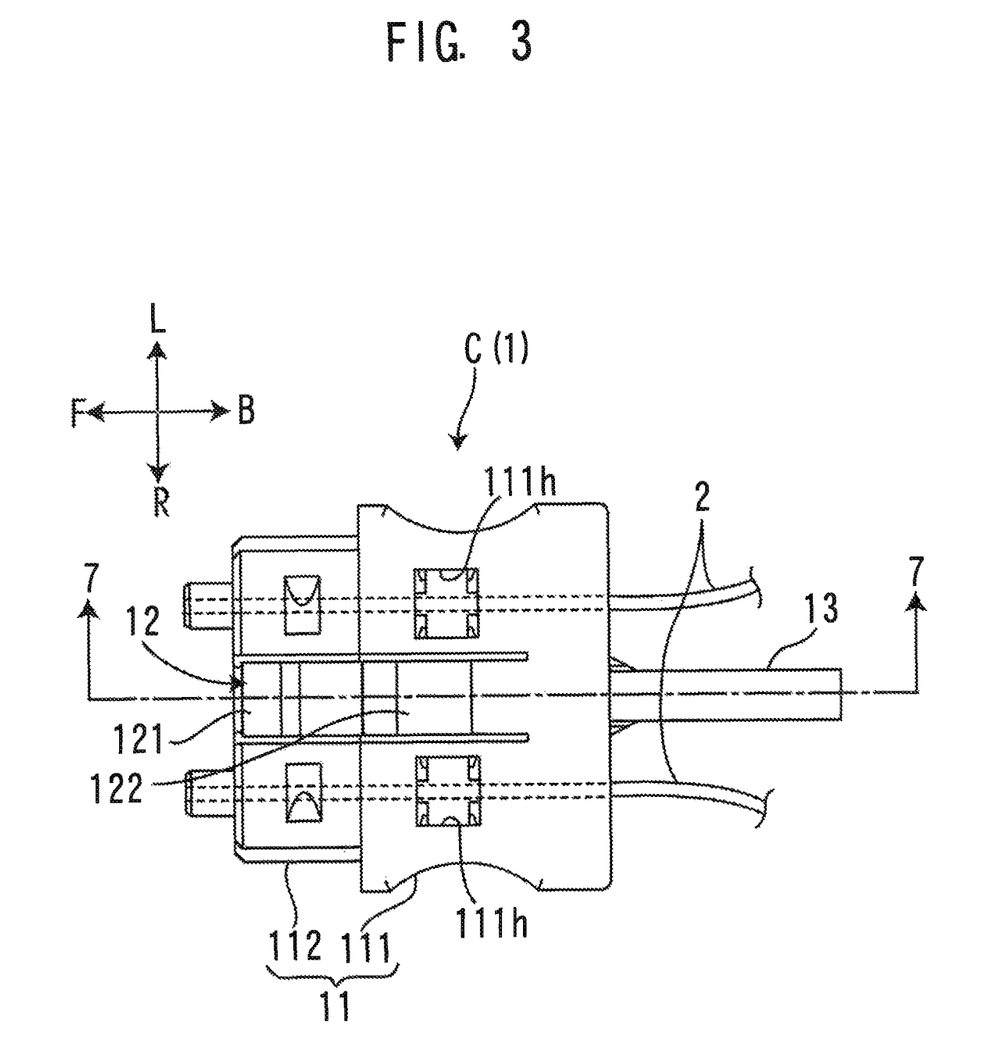
FIG. 3 is a plan view illustrating the embodiment of the locking connector.
Figure 4:
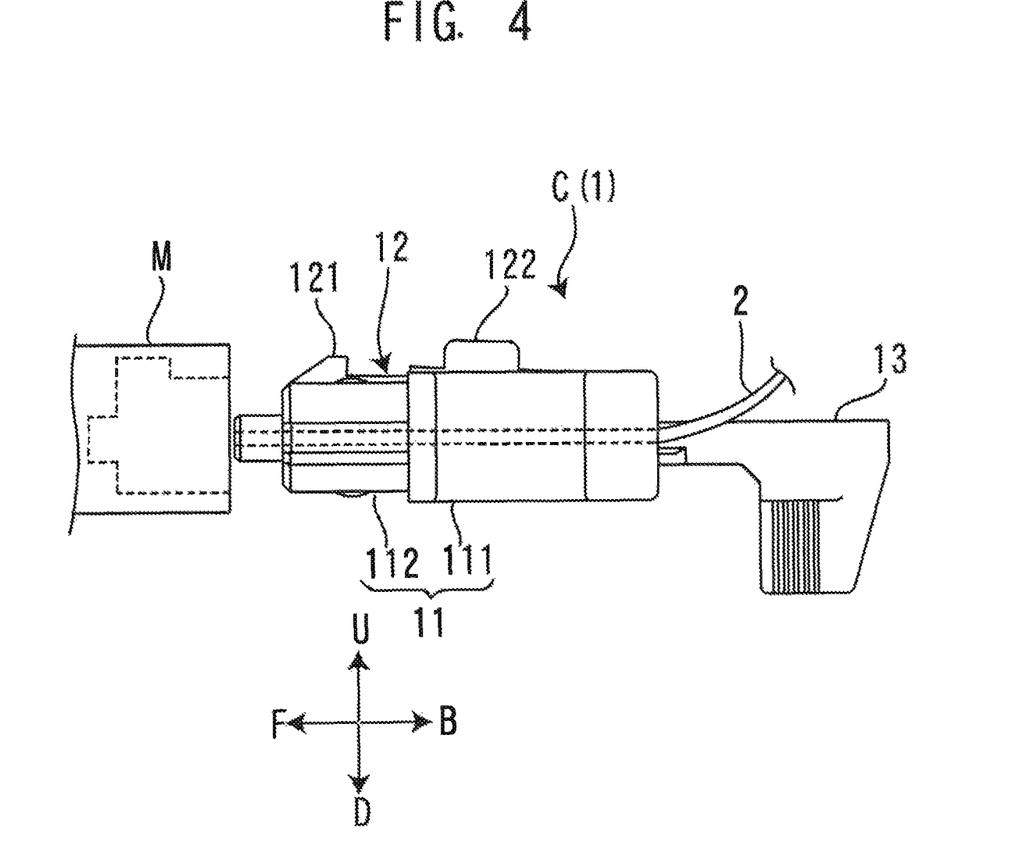
FIG. 4 is a side view illustrating the embodiment of the locking connector.
Figure 5:
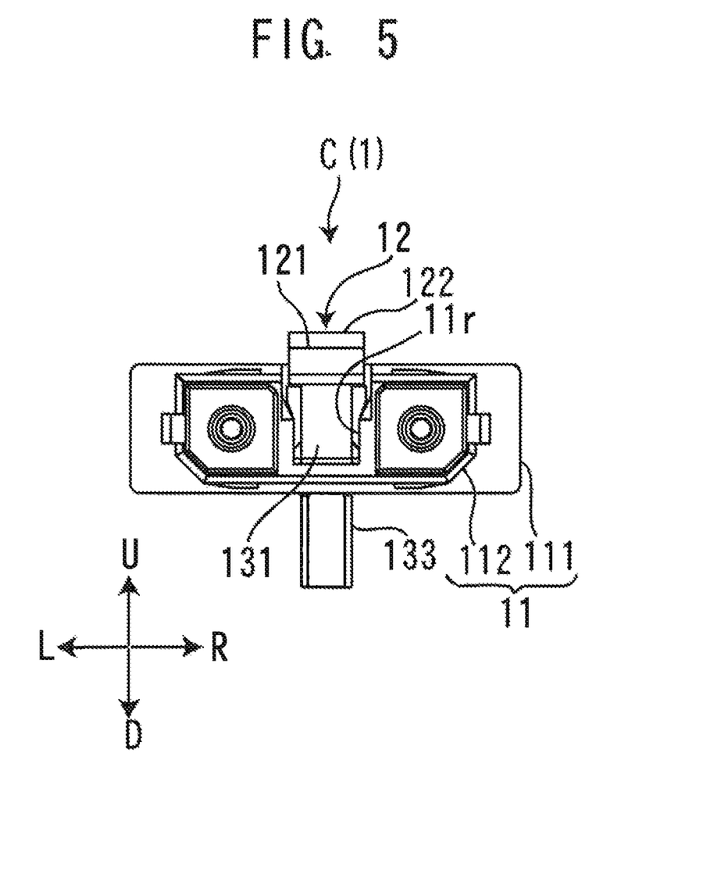
FIG. 5 is a front view illustrating the embodiment of the locking connector.

A connector C illustrated in FIGS. 1-6 is an optical connector for terminating optical cables 2. The optical cables 2 are illustrated in FIGS. 3 and 4. In addition, an illustrative optical module M is depicted in FIG. 4. The connector C is a plug-type connector which is inserted into and engages with the optical module M. A direction in which the connector C is inserted into with the optical module M is referred to as a mating direction F. A direction in with the connector C disengages with the optical module M is referred to as a disengagement direction B.

The connector C includes a housing 1. The housing 1 includes a body 11, a lock arm 12 and a lock release arm 13. The housing 1 can be formed by molding an insulating synthetic resin or other suitable insulating materials. In an embodiment, the body 11, the lock arm 12 and the lock release arm 13 are integrally molded.

In an embodiment, the body 11 supports a first and a second optical cable 2. The body 11 includes a receiving section 111 to receive the optical cables 2 and mating section 112. The receiving section 111 is located on a terminal end of the body, and the mating section 112 is provided at a mating end of the body 11, whereby the mating end is opposite the terminal end. The mating direction F passes from the terminal end towards the mating end. The two optical cables 2 are inserted into the receiving section 111 at the terminal end and extend in the mating direction F through the receiving section 111 and into the mating section 112 The optical cables 2 extend approximately in parallel with each other to pass through the receiving section 111 and the mating section 112 in the mating direction F. Mating ends of the two optical cables 2 protrude from the surface of the mating end of the mating section 112. The receiving section 111 is provided with receiving openings 111h on routes of the optical cables 2. The optical cables 2 are fastened to the receiving section 111 by fastening members (not illustrated) which are inserted in the receiving openings 111h.

Figure 6:
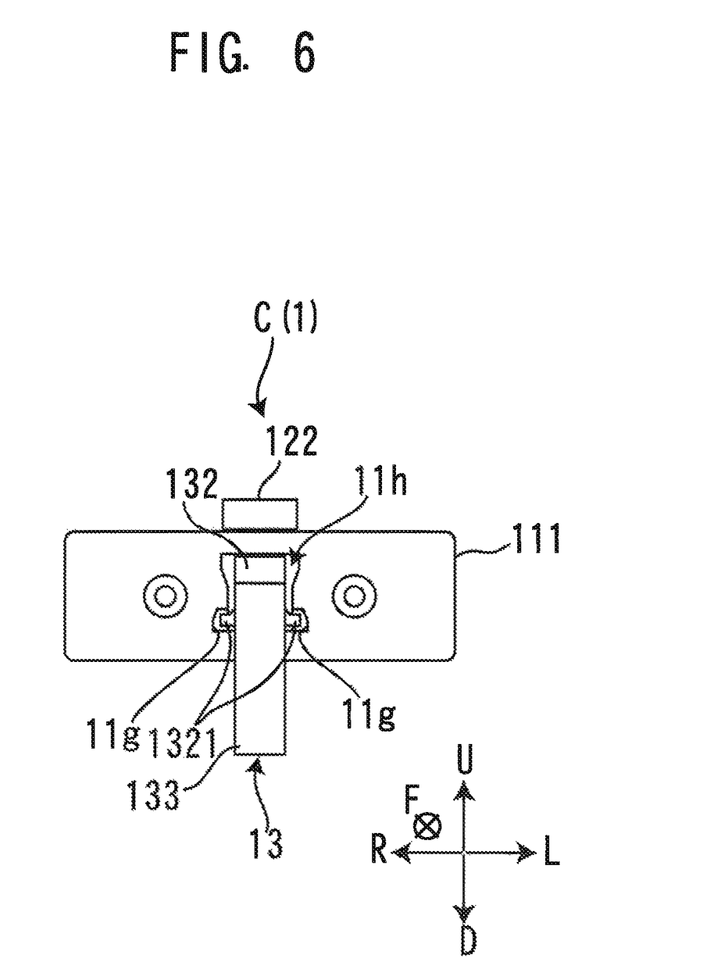
FIG. 6 is a rear view illustrating the embodiment of the locking connector.
Figure 7:
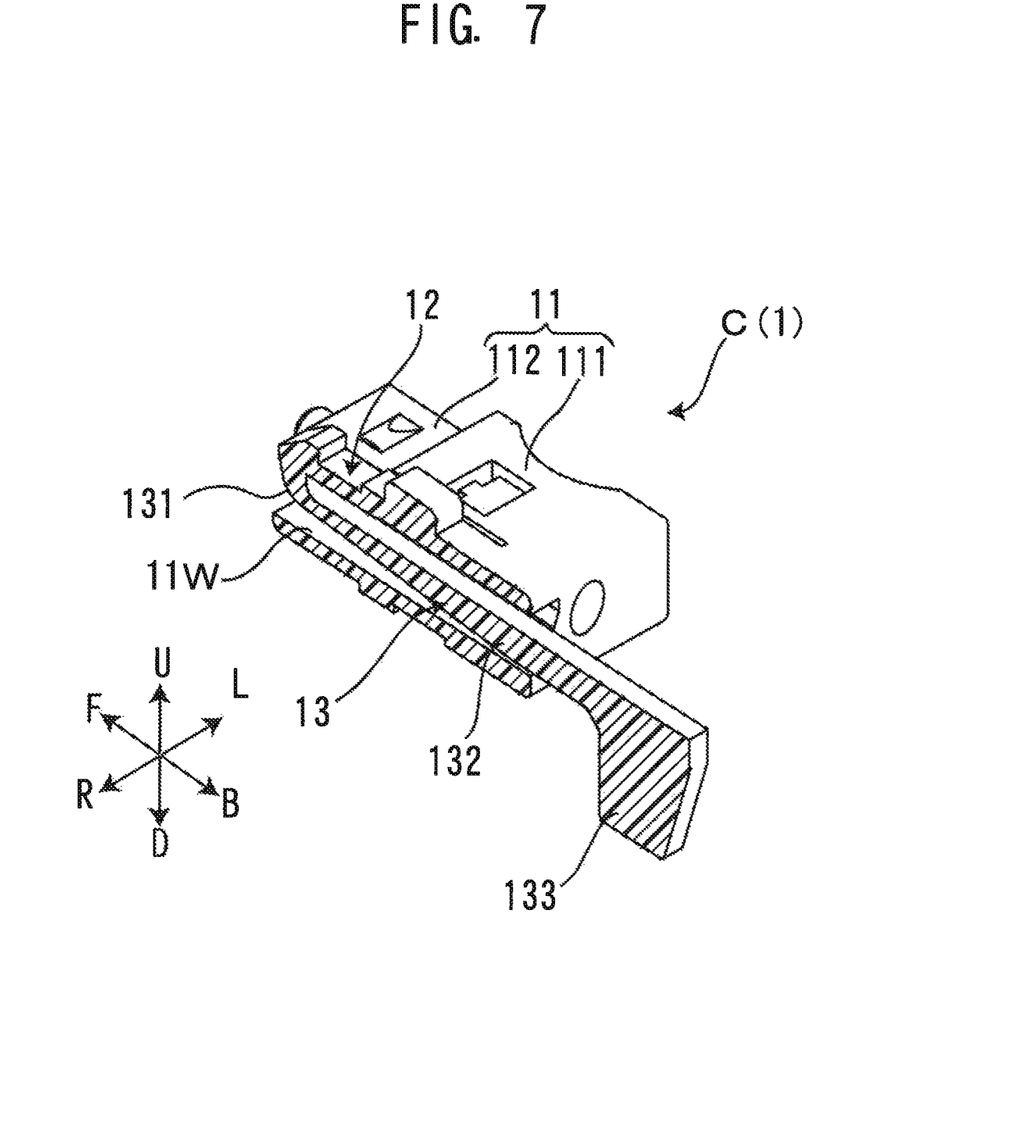
FIG. 7 is a perspective sectional view taken along the line 7-7 of the locking connector illustrated in FIG. 3.

The body 11 includes a groove 11r (see FIG. 5) and an arm receiving passageway 11h (see FIG. 6). The groove 11r is disposed between the first and the second optical cables 2, and extends from the mating end of the mating section 112 to a midpoint of the receiving section 111 along the axis of the mating direction F. The arm receiving passageway 11h extends through the terminal end of the receiving section 111 to the groove 11r at the midpoint of the receiving section 111. The lock arm 12 and the lock release arm 13 are disposed in the groove 11r. In addition, the lock release arm 13 passes through the arm receiving passageway 11h and protrudes from the terminal end of the receiving section 111.

The lock arm 12 is cantilevered such that a pivoting end is integrally formed with a midpoint of the receiving section 111. The lock arm 12 extends toward the mating end of the body 11 in the groove 11r along the mating direction F. The lock arm 12 extends, as illustrated in FIG. 4, along an upper surface of the mating section 112 in FIG. 4. A locking projection 121 is disposed on a mating end of the lock arm 12 and projects outward from the upper surface U of the mating section 112, orthogonal to the mating direction F. The locking projection 121 is engageable with a receiving space on the optical module M. A release projection 122 is disposed on a midpoint of the lock arm 12, and projects outward from the upper surface U of the receiving section 111 similarly to the locking projection 121.

The lock release arm 13 includes an offset section 131, a shaft 132 and a hook 133. The offset section 131 is integrally formed with the mating end of the lock arm 12 and extends inward from the mating end of the lock arm 12. The shaft 132 extends from the offset section 131 in the disengagement direction B, and travels parallel with the lock arm 12. The shaft 132 further comprises a pair of raised guided projections 1321 located along opposite sides of the shaft 132. The hook 133 is disposed on a terminal end of the lock release arm 13, and projects away from the upper surface of the body 11 in a direction opposite that of the locking projection 121 and the release projection 122.

The lock release arm 13 is positioned in the groove 11r and the arm receiving passageway 11h and extends along an inner wall 11w of the groove 11r and the arm receiving passageway 11h, in the mating direction F. The inner wall 11w extends continuously along the groove 11r and arm receiving passageway 11h and has a width that is greater than the width of the lock release arm 13. As illustrated in FIG. 6, a pair of guide grooves 11g are recessed into the pair of opposing inner side walls that project orthogonally from the inner wall 11w of the arm receiving passageway 11h and guide the lock release arm 13 in the mating direction F. The guide grooves 11g are provided on both inner side wall surfaces of the arm receiving passageway 11h and extend along the axial direction of the body 11 in the mating direction F. In addition, as illustrated in FIGS. 2 and 6, the pair of guided projections 1321 engage the guide grooves 11g. The lock release arm 13 is guided by the guide grooves 11g, so that the lock release arm 13 moves in the mating direction F.

Figure 8:
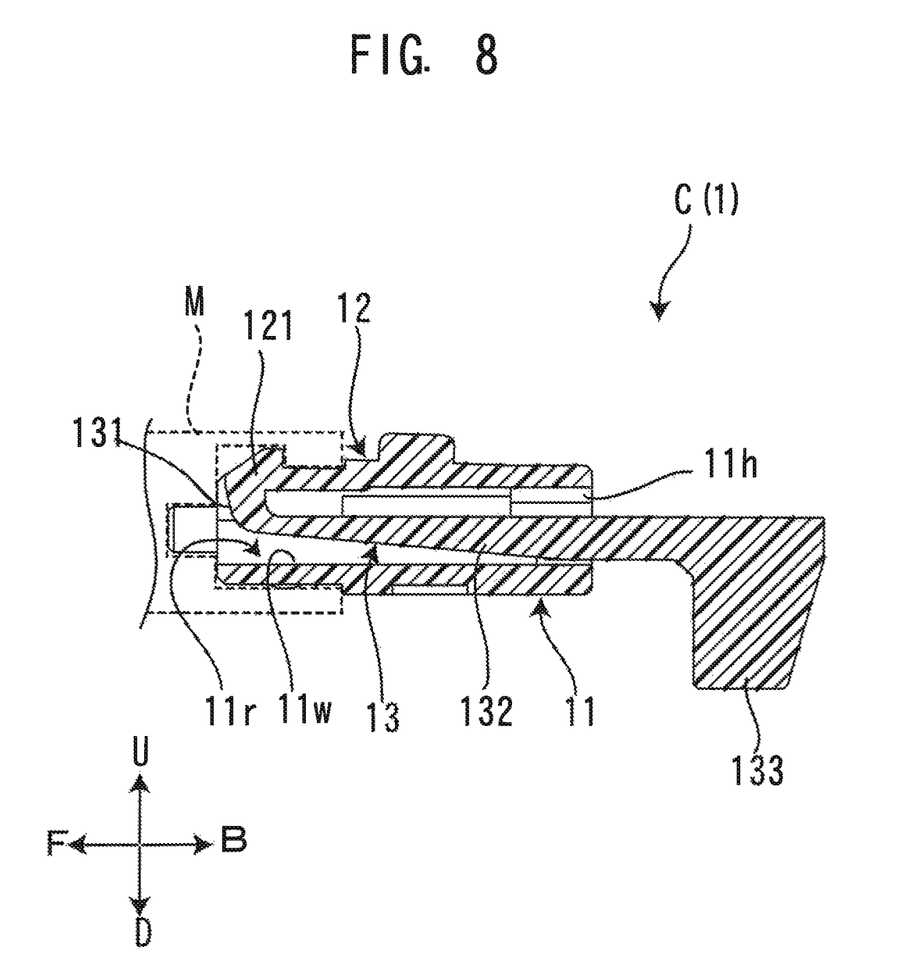
FIG. 8 is a vertical sectional view taken along the line 7-7 of the locking connector illustrated in FIG. 3 and shows an optical module M engaged with the locking connector.

When the connector C illustrated in FIG. 4 is mated with the optical module M, the mating section 112 of the body 11 is inserted into the optical module M. At this moment, the lock arm 12 is also inserted into the optical module M. The locking projection 121 of the lock arm 12 engages the optical module M such that the lock arm 12 is elastically deformed in an inward direction. As illustrated in FIG. 8, upon engagement of the connector C with the optical module M, the locking arm 12 recovers from the elastic deformation and the locking projection 121 locks to the optical module M.

The lock release arm 13 is integrally formed to the mating end of the lock arm 12, and is arranged further inward than the lock arm 12. Thus, when the hook 133 pulled in the disengagement direction B, the pivot of the cantilevered lock arm 12 is forced to pivot inward, causing the terminal end of the lock arm 12 to be displaced into the groove 11r. As a result, the locking projection 121 disengages from the optical module M and the connector C unlocks from optical module M.

Figure 9:
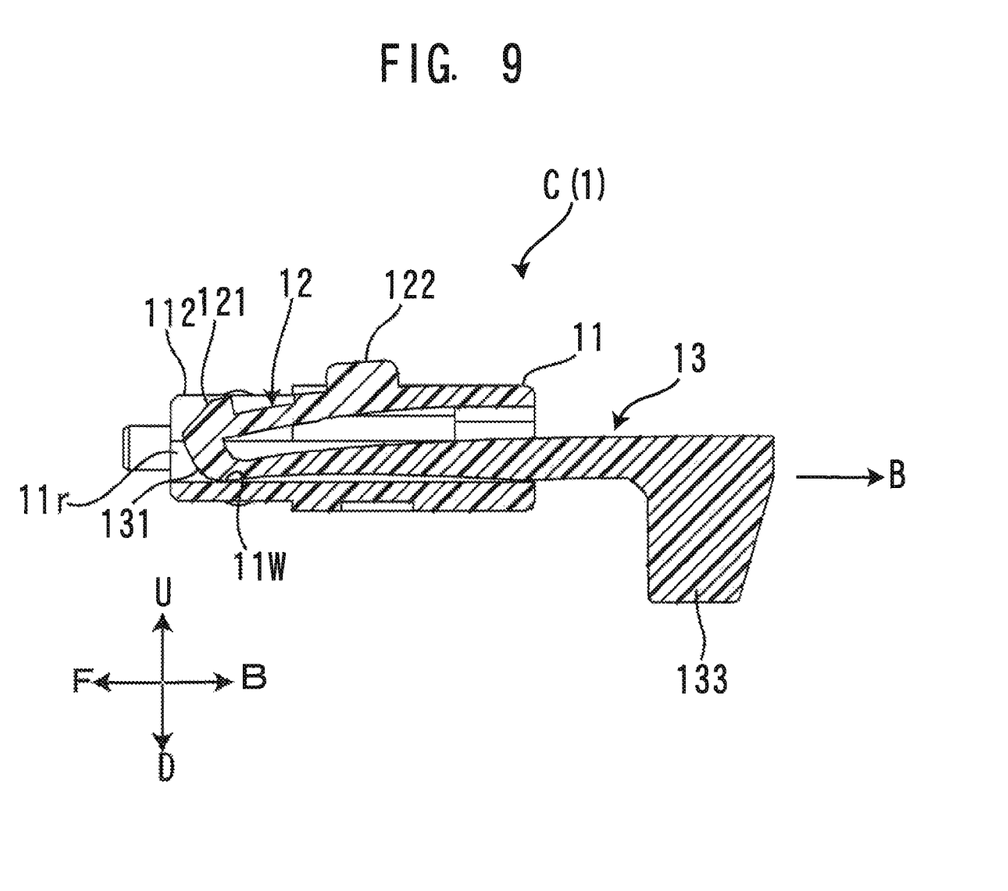
FIG. 9 is a vertical sectional view illustrating a lock released state of the locking connector illustrated in FIG. 8.

As illustrated in FIG. 9, when the lock release arm 13 is pulled in the disengagement direction B, the offset section 131 abuts on the surface of the inner wall 11w of the groove 11r. The surface of the inner wall 11w functions as a stopper (anti-overstress) to prevent the lock arm 12 from being further displaced into the groove 11r. Accordingly, lock arm 12 is limited in the distance it can be displaced into the groove 11r.

When the hook 133 is further pulled in the disengagement direction B, the connector C pulled out of the optical module M. For the connector C of the present embodiment, the unlocking step of the connector C to the optical module M and detaching of the connector C are performed by one operation of pulling the hook 133 of the lock release arm 13 in the disengagement direction B.

The lock release arm 13 is arranged in a position interposed between the inner wall 11w and lock arm 12, such that the lock release arm 13 is provided inside the body 11. Therefore, a force to pull the lock release arm 13 in the disengagement direction B acts along the axis of the body 11 to both unlock the locking projection 121 from the optical module M, and to pull the connector C out of the optical module M in an axial direction. Accordingly, since the connector C is disengaged and removed from the optical module M along the axial direction and not at an angle, damage to the mating ends of the optical cables 2 is avoided.

In addition, the lock release arm 13 is guided by the guide grooves 11g (see FIG. 6) along the disengagement direction B. Therefore, even if the lock release arm 13 is pulled in a direction inclined with respect to the disengagement direction B, the guide grooves 11g ensure that the lock release arm 13 is still displace along the disengagement direction B.

Additionally, in the present embodiment, it is possible to release locking of the lock arm 12 also by directly pushing down the release projection 122 of the lock arm 12 in the downward direction D. However, when other modules or electronic components are arranged close to the optical module M, it is difficult to operate the release projection 122 while holding the release projection 122. In the connector C of the present embodiment, the lock release arm 13 projects more than the body 11 in the disengagement direction B. Since only the lock release arm 13 and the optical cables are present on a side of the disengagement direction B more than the body 11, it is easy to operate the lock release arm 13 using one's fingers. In addition, since the hook 133 projects in the hook form from the lock release arm 13, it is possible to pull the hook 133 in the disengagement direction B.

While various embodiments of the present invention have been described above, one of ordinary skill in the art would recognize that these embodiments are exemplary and are not limited thereto, and that other modifications and improvements can be applied.

For example, one of ordinary skill in the art would appreciate that in alternative embodiments the number of optical cables may be one, three, four or more.

In addition, in the above-described embodiment, as an example of the mating component according to the present invention, the optical module M in which an optical transmit and receive device is housed is described. However, in other embodiments, the mating component may be a connector which supports an optical cable.

Furthermore, while the above described embodiment relates to supporting optical cables, in other embodiments, the connector may be an electrical connector which supports electrical wires as an information carrying member. One of ordinary skill in the art would appreciate that the electrical wires may carry electrical signals or may carry electrical power.

What is claimed is:

1. A locking connector comprising:
   a body with a receiving section and a mating section;
   a cantilevered lock arm with a pivoting end integrally formed with a midpoint of the receiving section and extending along an axial direction towards a mating end of the mating section;
   a locking projection disposed on an outer surface of a mating end of the cantilevered lock arm; and
   a lock release arm integrally formed with the mating end of the cantilevered lock arm and separately extending along the axial direction from the mating end of the cantilevered lock arm towards the receiving section, and projecting from a terminal end of the receiving section.

2. The locking connector according to claim 1, wherein the body further comprises a groove extending from the mating end of the mating section to a midpoint of the receiving section along the axial direction of the body.

3. The locking connector according to claim 2, wherein the body further comprises an arm receiving passageway continuously connected with the groove and extending along the axial direction of the body from the midpoint of the receiving section to the terminal end of the receiving section.

4. The locking connector according to claim 3, wherein the lock release arm is disposed in the groove and the arm receiving passageway.

5. The locking connector according to claim 2, wherein the body further comprises an inner wall extending continuously along the groove.

6. The locking connector according to claim 3, wherein the body further comprises an inner wall extending continuously along the arm receiving passageway.

7. The locking connector according to claim 6, wherein the inner wall has a width that is greater than the width of the lock release arm.

8. The locking connector according to claim 3, wherein the body further comprises an inner wall extending continuously along the groove and arm receiving passageway.

9. The locking connector according to claim 8, wherein the inner wall has a width that is greater than the width of the lock release arm.

10. The locking connector according to claim 3, wherein the arm receiving passageway further comprises a pair of opposing side walls, each opposing side wall having a guide groove which extends along the axial direction of body.

11. The locking connector according to claim 10, wherein the lock release arm further comprises guided projections corresponding to the guide grooves.

12. The locking connector according to claim 2, wherein the cantilevered lock arm and the lock release arm are disposed in the groove.

13. The locking connector according to claim 12, wherein the lock release arm is disposed further inward than the lock arm.

14. The locking connector according to claim 5, wherein the cantilevered lock arm is structurally biased, and the inner wall is a stopper.

15. The locking connector according to claim 3, wherein the cantilevered lock arm is disposed in the groove and the lock release arm is disposed in the groove and the arm receiving passageway.

16. The locking connector according to claim 15, wherein the lock release arm is disposed further inward in the groove than the cantilevered lock arm.

\* \* \* \* \*